United States Patent [19]

Itri et al.

[11] Patent Number: 5,515,497
[45] Date of Patent: May 7, 1996

[54] METHOD AND APPARATUS FOR SELECTING AND DISPLAYING ITEMS IN A NOTEBOOK GRAPHICAL USER INTERFACE

[75] Inventors: Christopher N. Itri; Denise F. Loose, both of Austin; Richard W. Ragan, Jr., Round Rock, all of Tex.

[73] Assignee: International Business Machines Corporation, Armonk, N.Y.

[21] Appl. No.: 405,424

[22] Filed: Mar. 15, 1995

Related U.S. Application Data

[63] Continuation of Ser. No. 48,500, Apr. 16, 1993, abandoned.
[51] Int. Cl.$^6$ .................................................. G06F 3/14
[52] U.S. Cl. .................... 395/159; 395/156; 395/157; 395/160
[58] Field of Search ..................... 395/159, 157, 395/160, 156, 161; 345/119, 146, 120

[56] References Cited

U.S. PATENT DOCUMENTS

| | | | |
|---|---|---|---|
| 5,065,347 | 11/1991 | Pajak et al. | 395/159 |
| 5,140,677 | 8/1992 | Fleming et al. | 395/159 |
| 5,179,718 | 1/1993 | MacPhail | 395/160 X |
| 5,237,651 | 8/1993 | Randall | 395/157 X |
| 5,283,864 | 2/1994 | Knowlton | 395/159 X |
| 5,305,435 | 4/1994 | Bronson | 395/159 |
| 5,361,349 | 11/1994 | Sugita et al. | 395/157 X |
| 5,388,196 | 2/1995 | Pajak et al. | 395/161 X |
| 5,392,387 | 2/1995 | Fitzpatrick et al. | 395/156 |
| 5,438,662 | 8/1995 | Randall | 395/161 |
| 5,463,724 | 10/1995 | Anderson et al. | 395/159 X |

OTHER PUBLICATIONS

Research Disclosure, "Methodology for Using Notebook Booktabs for the Hierarchical Display of Information" No. 340, Aug. 1992, p.594.
IBM TDB "Visual Two–Level Information Categorization", vol. 35, No. 2, Jul. 1992, pp. 189–190.
IBM TDB, "Notebook Control Cascading Tab Choices", vol. 35, No. 4B, Sep. 1992, pp. 284–285.
IBM TDB, "Specification and Deletion of Database Table Foreign Keys", vol. 34, No. 2, Jul. 1991, pp. 141–142.
IBM TDB, "System Notebook Visual Rendition", vol. 35, No. 2, Jul. 1992, p. 225.

*Primary Examiner*—Raymond J. Bayerl
*Attorney, Agent, or Firm*—Mark E. McBurney; David A. Mims, Jr.

[57] ABSTRACT

A system including a graphical user interface provides a list box of items relating to data entered on pages of a displayed notebook. By selecting the desired item, the displayed notebook immediately flips to the page having the desired data entry. Further, the items listed in the box may be representative of a specific parameter included in the desired notebook entry. When the desired item is selected and the page is flipped to the corresponding page, the cursor will be located at the parameter represented in the list box. A relational facility is used to correlate the items in the list box with the notebook page on which the item can be found. The list box may be displayed to a system user as the left hand page of a spiral notebook, with data entries on the right hand page. A list item entry is related to a page id, field id, or other data to determine an address for the page on which the selected item is found. Upon selection of a list item, this facility provides the address for the corresponding page and the system then displays the page with the desired data entry. In this manner, a user can select the exact parameter desired, without being required to scroll through a series of displayed pages to find the parameter, as in conventional systems.

3 Claims, 4 Drawing Sheets

METHOD AND APPARATUS FOR SELECTING AND DISPLAYING ITEMS IN A NOTEBOOK GRAPHICAL USER INTERFACE

This is a continuation of application Ser. No. 08/048,500 filed 4/16/93, now abandoned.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

CROSS REFERENCE TO RELATED APPLICATIONS

U.S. patent application, "Method and Apparatus for Improved Notebook Control in a Data Processing System", Ser. No. 07/997,419, having a filing date of Dec. 28, 1992, attorney docket number DA9-92-024, and assigned to the assignee of the present invention.

BACKGROUND OF THE INVENTION

The present invention generally relates to a graphical user interface for a computer system wherein data entries stored in the system can be easily accessed by a user. More particularly, a mechanism is provided which relates a data entry in the system to a displayed listing of all of the entries and allows the user to navigate through the data entries by interacting with the displayed list.

Currently, the IBM OS/2 operating system, version 2.0 utilizes displayed notebook pages as one means for representing data to a system user. These notebook pages are designed to make data presentation and retrieval clear and easy when using the system, since data can be retrieved and manipulated using objects that users are familiar with. For more information regarding the IBM OS/2 operating system, the reader is referred to "OS/2 2.0 Technical Library Programming Guide, Vol. 1, 2, 3, Version 2.00, Order Nos. 10G6261, 10G6495, 10G6494.

The IBM Technical Disclosure Bulletin, volume 35, number 2, July 1992, page 225 shows an unopened spiral notebook having a spin button which a user utilizes to turn the pages. A number of scrollable tabs are also shown which may be used to select various pages in the notebook.

Additionally, IBM Technical Disclosure Bulletin, volume 35, number 4B, September 1992, pages 284–285, is another representation of a notebook wherein a plurality of notebook pages are shown each with an alphabetically ordered tab. One of the shortcomings of this invention is the inability to show all of the 26 letters of the alphabet simultaneously. To solve this problems cascaded tabs are used wherein each tab has multiple letters associated with it. For example, U-W is included on a single tab and an arrow is also included on the tab such that the user can scroll between the letters on the tab and select the one of interest.

However, all of the conventional notebook representations require a user to tab or scroll through the alphabet to find a specific data entry. It can be seen that it would be extremely advantageous to have a system wherein a user could directly access data on a notebook page, independent of which page of the notebook is currently being displayed, by selecting a listed item corresponding to the desired data.

SUMMARY OF THE INVENTION

In contrast to the prior art, the present invention provides a list box of items relating to data entered on pages of a displayed notebook in a graphical user interface. By selecting the desired item, the displayed notebook immediately flips to the page having the desired data entry. Further, the items listed in the box may be representative of a specific parameter included in the desired notebook entry. When the desired item is selected and the page is flipped to the corresponding page, the cursor will be located at the parameter field represented in the list box.

Broadly, the present invention uses a relational facility which correlates the items in the list box with data representing the notebook page on which the item can be found, or a particular desired field, or entry on the page. The list box may be displayed to a system user as the left hand page of a spiral notebook, with data entries on the right hand page. When a user selects a list item, the relational facility automatically associates corresponding data in another list. This corresponding data will include a page id, and a field id. The list item will correspond to a specific control field in the page, whether it is a particular desired field or the first field, used as a default setting. It should be noted that another preferred embodiment of the present invention allows a single field id to be utilized as a default setting for a plurality of pages. That is, in the present invention, each notebook page is a window having identical dimensions and which can be specific to have identical locations for the control fields thereon. Thus, a global field id can be used for each notebook page that corresponds to a list item wherein it is desired that the cursor be initially placed on, for example, the first field on the page. The page id includes address information for the corresponding page. The system then displays the desired page with the cursor at the desired data field. In this manner, a user can select the exact page and parameter desired, without being required to scroll through a series of displayed pages to find the desired page, and then select a particular control field on the page to get the cursor placed in the proper position for data manipulation, as in conventional systems.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
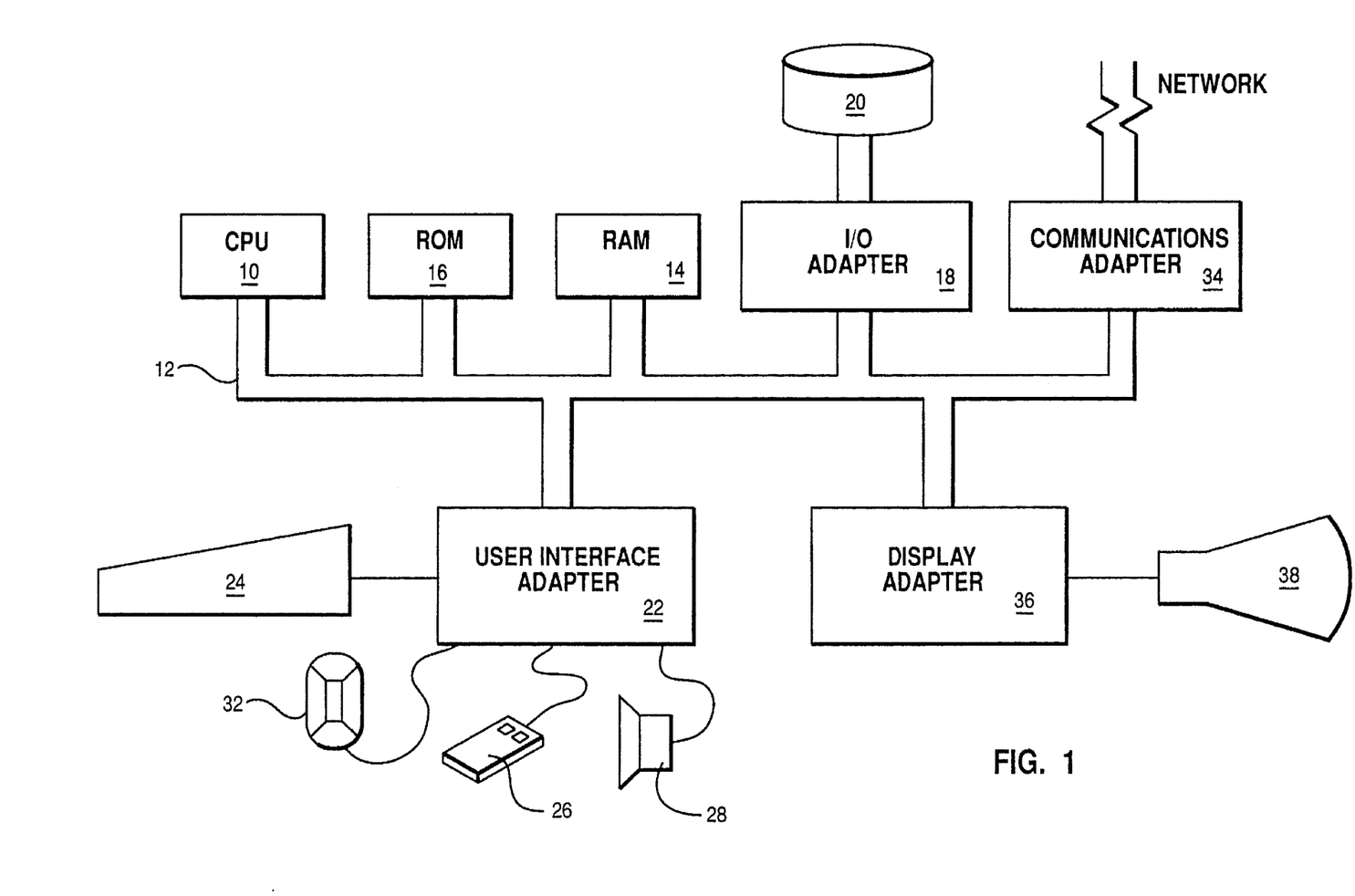
FIG. 1 is a schematic diagram representing hardware components of a typical data processing system capable of implementing the present invention.

Referring to FIG. 1, a typical data processing system is shown which may be used in conjunction with the present invention. A central processing unit (CPU), such as one of the Intel X86 processors is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. These I/O devices allow a user to place a system cursor at any desired position on a display and to select, or enter data as needed. Display monitor 38 is connected to system bus 12 by display adapter 36. In this manner, a user is capable of inputting to the system through the keyboard 24, track ball 32 or mouse 26 and receiving output from the system via speaker 28 and display 38. Additionally, the operating system such as DOS or the OS/2 system (OS/2 is a Trademark of IBM Corporation) is used to coordinate the functions of the various components shown in FIG. 1.

Figure 2:
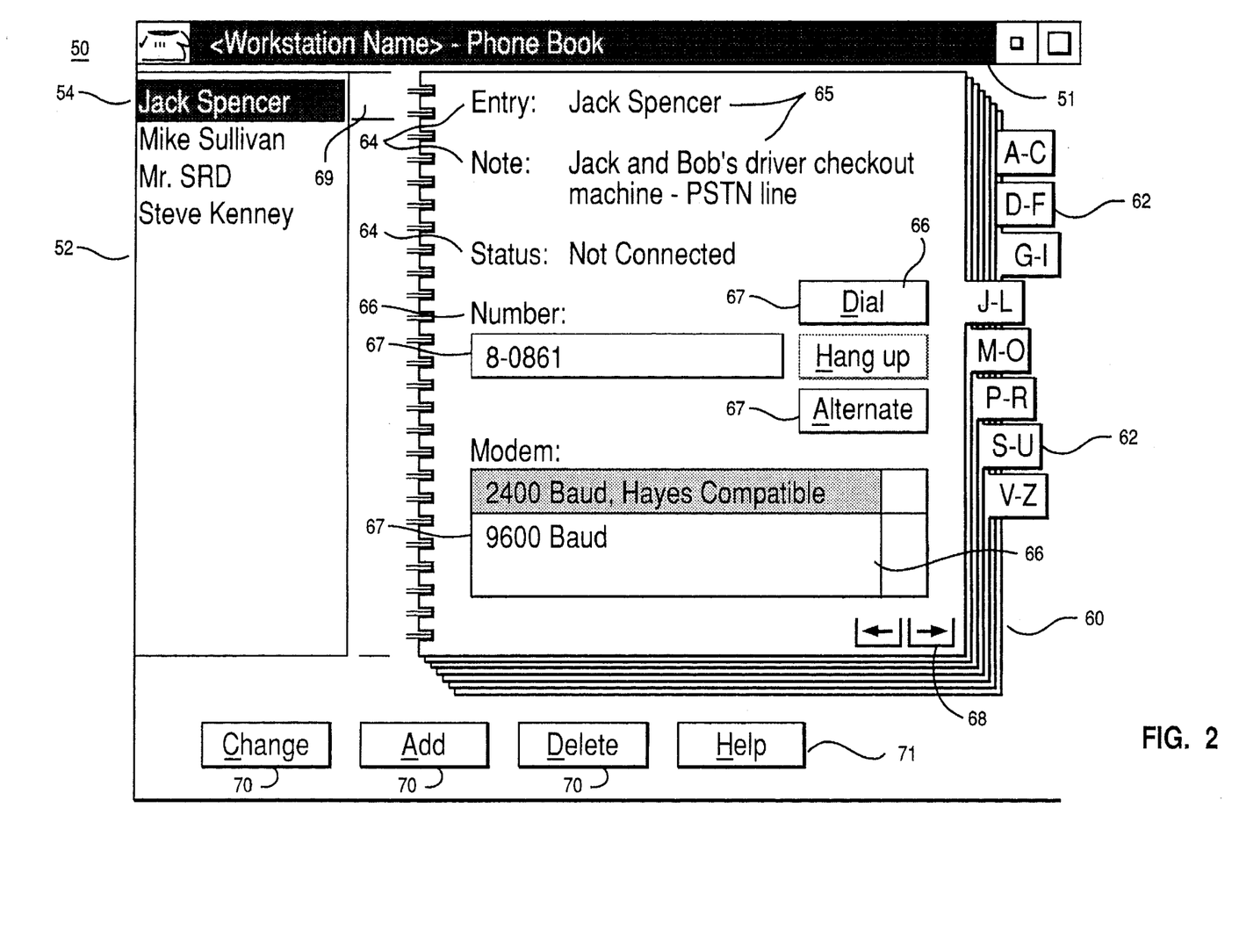
FIG. 2 is a representation of the graphical user interface of the present invention wherein the list box is shown displayed as the left hand page of a spiral notebook.

FIG. 2 is a graphical representation of the present invention wherein numeral 50 generally represents a graphical object displayed on monitor 38 of the system shown in FIG. 1. Object 51 is a title bar noting the name of the object 50. It can be seen from FIG. 2, that the object 50 is a spiral notebook wherein right hand page 60 represents a first portion of the object including a plurality of parameters 64 including fields 65 which contain data that a user may wish to manipulate and/or view. For example, parameter 64 includes an entry field 65 for a title of the data entered on page 60. Additionally, other fields 65 are provided for notes, status and other data which may be edited or viewed by the user. Additional parameters 66 including fields 67 include data which will cause the operating system to control the system hardware (FIG. 1) and cause the computer to perform specific functions such as dialing a primary or alternate telephone number for the data entered (phone numbers) in fields 67 on page 60 and allowing modem status to be displayed. Thus, it can be seen that a user can manipulate and/or merely view information relating to parameters 64 and 66, shown on page 60 of object 50. Further, tabs 62 are shown on page 60 and in FIG. 2, and include a set of pages which may be selected. By selecting one of these tabs the first page of the set corresponding to the selected tab will be displayed. Once the first page of a selected set is displayed the user may scroll through various pages in the set, corresponding to the selected tab, using scroll arrow 68. The user then must select a desired field on the displayed page to manipulate data shown thereon. It can be seen that in order for the user to navigate through the various pages and entries shown in object 50, a relatively large number of input actions must be performed, e.g. keystrokes or mouse clicks. For example, if a user desires the entry for an individual, e.g. a name beginning with the letter F, the user will select the tab 62 corresponding to letters D-F. Next, the page 60 corresponding to the first entry where the names having letters D-F will be displayed. Thus, the displayed entry will, in all likelihood, correspond to an individual whose name begins with a D and the user will then have to use arrow 68 to scroll through the entries D-F in order to find the individual desired. Once the desired page (F) is displayed the appropriate data entry field must then be selected. It can be seen that a great number of user inputs may be required in order to reach the desired entry.

The present invention provides a list box 52 including items 54 corresponding to each page 60 in notebook 62. List box 52 is displayed as a left hand page of the spiral notebook, where pages 60 are shown as the right hand pages of the notebook in order to provide the user with a familiar object to work with. It should be noted that the "left hand page", i.e. the list box 52 does not turn. If more items 54 are presented than can be displayed at one time, the items can be scrolled through using a scroll bar 69. Items 54 are reviewed by the user and then selected using either a keyboard, mouse, or other input/output device such that the exact page 60 containing the data entry corresponding to item 54 will be automatically displayed. Therefore, numerous user inputs (keystrokes or mouse clicks) are eliminated since tab keys 62 and scroll arrow 68 are not utilized. Additionally, list items can be changed, added or deleted using software buttons 70, and a user can access help using software button 71. It should be noted that the list items may also correspond to a specific control field on a particular page. For example, the list item may be "Jack Spencer's Number". Upon selection of this item, the present invention immediately turns the right hand side of the notebook to the appropriate page 60 and places the cursor on the "Number" field 66, using the page ids and field ids, respectively, corresponding to the selected list item. Further, it should be understood that the relational facility, described below with regard to FIG. 4, will correspondingly scroll through the list items if a user chooses to scroll through the notebook pages 60 or between parameters 64, 66 (i.e. fields 65, 67) using the tab functions. The list items are shown as selected by displaying them with reverse video highlighting, or the like.

Figure 3A:
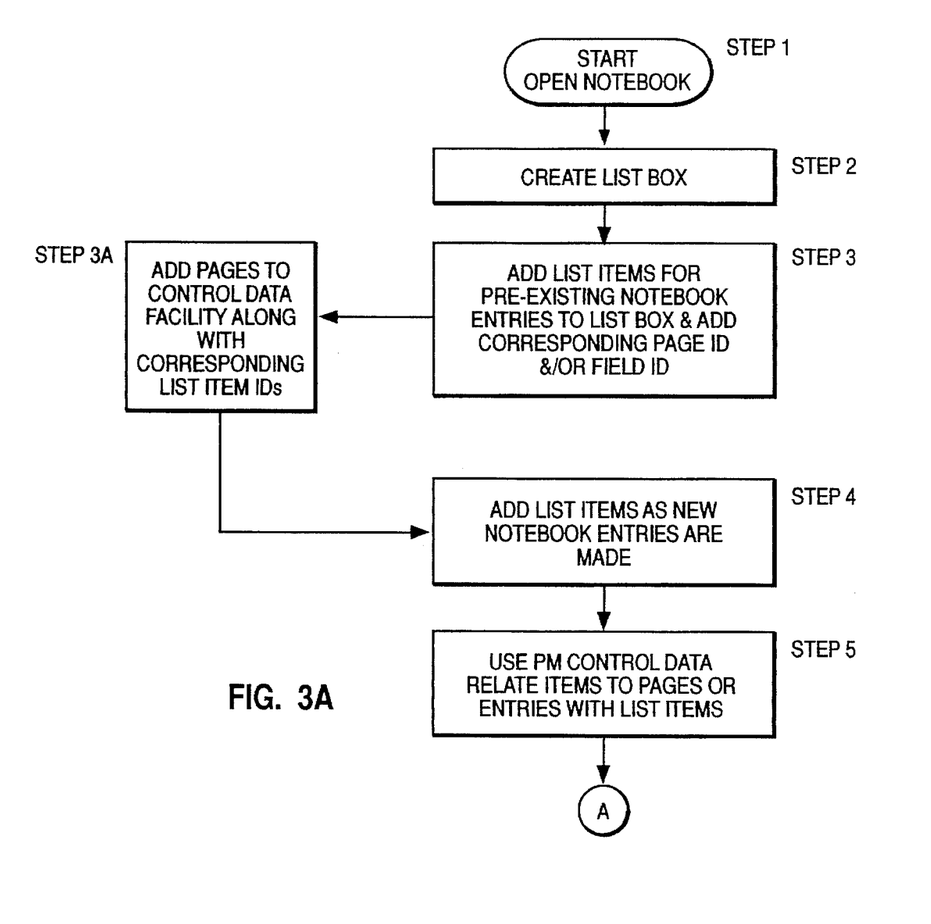
FIGS. 3A and 3B are flow charts showing the process by which the present invention is implemented.
Figure 3B:
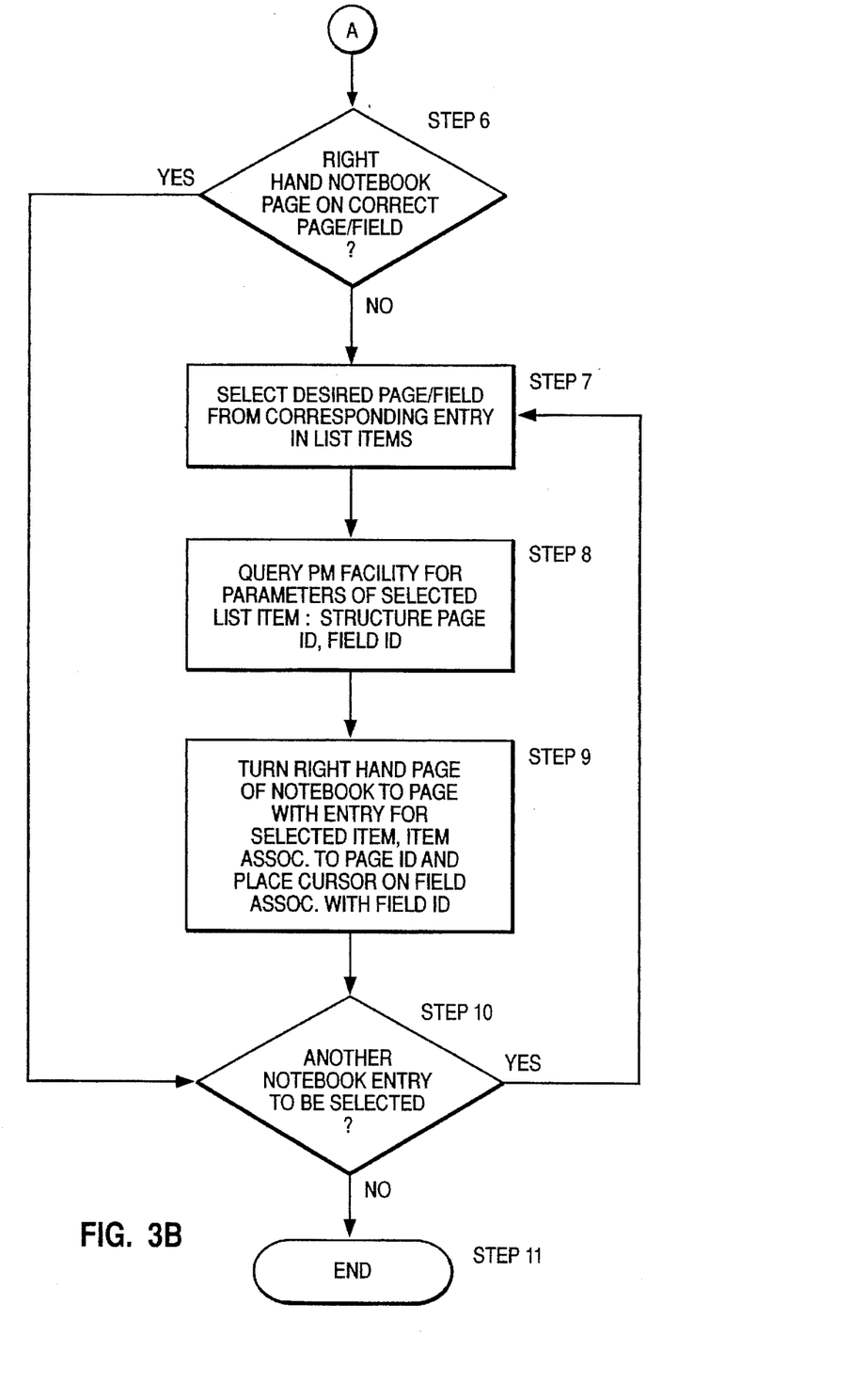

The flow charts of FIGS. 3A and 3B illustrate the process by which the present invention allows a user to automatically select and display one of a plurality pages, or other data organization objects, and to select a control field, or entry field, on the page by having the system cursor automatically placed thereon. At step 1, the process is started and the notebook object is opened. Step 2, creates the list box 52 of FIG. 2 having a plurality of items 54 listed therein. Upon opening the notebook, the present invention adds list items 54 to box 52 by adding the items to the relational facility for any pre-existing notebook entries shown on page 60 (step 3). Also, the related data (e.g. page id, field id) is added to the facility at this time. The relational facility of the present invention also adds list items to box 52 as new notebook entries are made. That is, when a user adds a new notebook page (as may be the case when a non alphabetical notebook object is used), or adds a name, or other associated data to a page 60 of the notebook of FIG. 2, a list item 54 for that entry is automatically created and added to the box 52. In other words, the relational facility is also used to list the pages and fields as items and have corresponding data, i.e., list item ids in a related list (step 3a). The relationship between the list items 54 of box 52 and the entries on page 60 is maintained through use of a relational facility which is included in the Presentation Manager (PM) feature of the OS/2 operating system (Presentation Manager is a trademark of the IBM Corporation) and is described in more detail with regard to FIG. 4. This facility is also know as the Control Data, or Window Word facility and is used in a preferred embodiment of the present invention to directly associate list items 54 to the specific page 60 on which an associated entry is located, and to relate and place the system cursor on a control field on the page (i.e. to select the field). For additional information regarding this relational facility the reader is referred to the IBM Presentation Manager Program Reference, published by IBM Corp., Vols. 1, 2, 3, March 1992 Edition, Order Nos. S10G-6264-00, S10G-6265-00, S10G-6272-00. More particularly, volume 3, chapter 16, describes the list item facility, chapter 25 describes use of a list for the data associated with the notebook page. The field id information is included in a description of resource ids, used through the three volume set.

At step 6, it is then determined whether the right hand notebook page 60 is on a correct page such that the data the user wishes to view or manipulate is displayed. If the desired right hand notebook page is not displayed, then the user will select the desired item from the list box 52 at step 7. Correspondingly, the entry in the list of items in the relational facility is selected and the related data in the corresponding data list in the facility is obtained (page id and field id) that will allow the present invention to turn the notebook to the selected page. That is, the system queries the list in the control data facility for parameters of the selected list items such as a page id, field id, and any other data structures (step 8). The notebook is then turned (step 9) to the desired page containing the data the user wishes to view or to manipulate, and place the cursor on the field, by turning on bits in a specific location in a frame buffer which correspond to the desired location on a display screen, or other methods known in the art. For example, the page id for the right hand notebook page, having the data corresponding to the selected item 54 is used to locate the desired page which is then displayed without the user having to scroll through alphabetical listings on tabs and pages to find the desired data entries. Subsequent to step 9, it is determined whether another notebook page and associated field entry is to be selected and if so, the process returns to step 7 wherein the desired notebook page containing the data entry is chosen by selecting the corresponding item 54 in the list box 52. If at step 6, it was determined that the desired right hand page was displayed, the process immediately skips to step 10, where it is determined if another parameter (data entry) or page is to be selected. If there are no other notebook entries to be selected, the method of the present invention proceeds to step 11 and ends.

Figure 4:
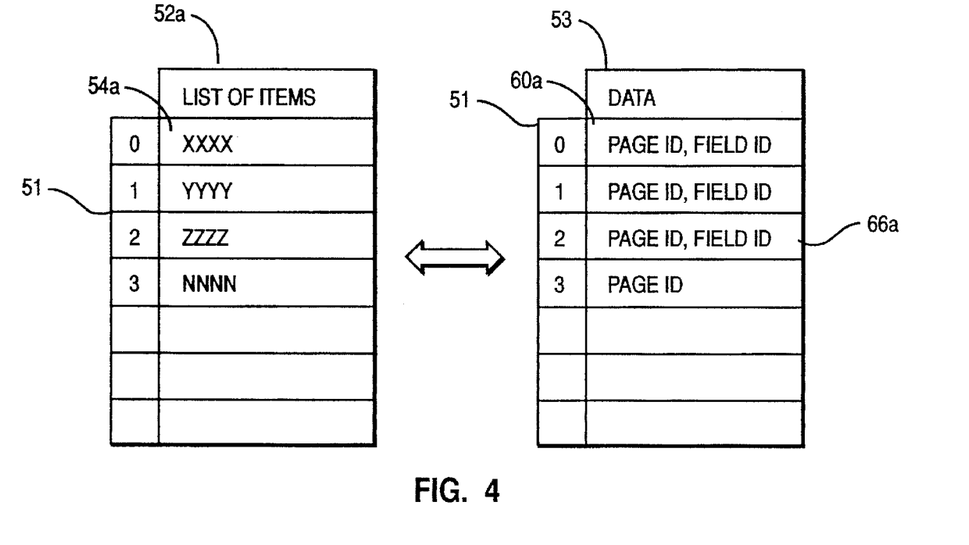
FIG. 4 is a schematic diagram showing the structure of the relational facility which allows the present invention to directly turn to a desired page, and place the cursor on a desired field, upon selection of an item from the list box.

FIG. 4, is a schematic representation of the Presentation Manager control data relational facility previously described. List 52a is shown and contains a plurality of items 54a corresponding to the items 54 displayed by object 50. The user selects a list item which corresponds to an item 54a. An index 51 then relates this entry 54a in list 52a to a data item 60a, 66a in another list 53, by maintaining a correspondence between the items in list 52a and the data in list 53, based on their relative positions in the list. That is, the item in the first position of list 52a is associated with the data in the first position of list 53, and so forth. The data in list 53 includes address and display information such that the proper page object 60 is displayed having the proper coloring, shading, and the like. Therefore, it can be seen by selecting an item 54 in list box 52, the PM facility knows which corresponding item 54a in list 52a has been selected and associates a data in an entry 60a in list 53 including a page id, field id, or the like, for a desired notebook page and field id (for a desired field on which the cursor is to be placed). In this manner, a user can select a list item 54 from box 52 such that a single one of the pages 60 containing the data entry corresponding to the selected item is automatically displayed, and the desired field is ready for data entry or manipulation, since the cursor has been automatically placed thereon.

For the sake of simplicity, the correlation between the list items and displayed notebook pages has been described when the user selects (or scrolls through) the list items. Those skilled in the art will appreciate that the control data facility can also be used to provide synchronization between the list items and pages, when the user scrolls through the pages using the tab and arrow keys. That is, the pages and fields would become the items in a list, such as 52a, and the list item ids would then be included in a related data list. Therefore, when the user selected a specific page, the list id would cause the corresponding list item to be displayed as selected. The Presentation Manager control data facility is a preferred embodiment, however other means of associating the list items and page data could be utilized by the present invention, such as a relational table, pointer, lookup table, or the like.

It should be noted that the notebook of FIG. 2 is shown as a telephone directory wherein the data displayed relates to telephone numbers, modem types, connection status and the like. However, those skilled in the art will understand that any type of data can be contained in the pages 60, and fields 65, 67 of notebook object 50. For example, a notebook containing pages corresponding to application programs installed on a user system could be displayed such that a user can immediately select a program to be invoked. The page corresponding to an application program may include such information as name, function and status information regarding the amount of resources required. Additionally, the user may manipulate the data in order to start or end the program. The application program list box may include items, such as program title or function (e.g. communication or word processing) that will allow a user to select the page corresponding to the desired program entry.

The following description and computer code will allow one skilled in this particular art to implement the preferred embodiment of the present invention. The present invention provides a quick path for a user to find something in a notebook control by selecting an item in a list adjoining the notebook control.

For some applications, there might be a one to one correspondence between items in the list, and pages in the notebook. For example, the previously noted phonebook application works exactly this way. Each page in the notebook corresponds to a person to be called, and the person's name is placed in the list. The user/control interaction in this case is very simple. If the user selects a name in the list, the right hand side of the notebook page is turned to the page corresponding to the selected item. If the user selects a new page in the notebook, the corresponding name in the list is selected to maintain synchronization between the page and selected item.

For other applications, there may be many items on the list that correspond a page in the notebook. For example, in a settings notebook, a user might want to put all of the parameters in the list, when there are multiple parameters on one page. In this case, the application designer must decide how the user/control interaction will work. Certainly, when the user selects a new item in the list, the corresponding page in the notebook should be changed. However, when the user selects a new page, the present invention must determine which items in the list will be shown as selected. Also, as the user cursors between the control fields 65, 67 on a page (e.g. cursor between parameters 66 of FIG. 2) you have to decide what to do in the list. It was determined that it would be distracting to change the list item selection as the user cursored through fields on the page. Therefore, in the preferred embodiment, when the user changes pages (via the page turn keys rather than selecting an item in the index list) the list item selections are changed to match the first control field on the page. Then as the user tabs to different controls on the page we do not change the list item selection. The code for this scenario is presented below.

Those skilled in this art will understand how this logic presents the relevant portions of the Presentation Manager (Presentation Manager is a trademark of IBM Corporation) message handling code for a window with a list box and a notebook control.

AT9-93-030

14 when the user changes pages (via the page turn keys
rather than selecting an item in the index list) the list
item selections are changed to match the first control
field on the page. Then as the user tabs to different
controls
on the page we do not change the list item selection.
The code for this scenario is presented below.

Those skilled in this art will understand how this
logic presents the relevant portions of the Presentation
Manager (Presentation Manager is a trademark of IBM
Corporation) message handling code for a window with a
list box and a notebook control.

```
/*********************************************************************
 *                                                                   *
 * This structure contains information about the page and control    *
 * to select when the user selects a new list item.  This data       *
 * will be linked to each list item as it is added to the list box.  *
 *                                                                   *
 *********************************************************************/
typedef struct _LISTITEMDATA
{
    ULONG    ulPageId;
    ULONG    ulControlId;
} LISTITEMDATA;

/*********************************************************************
 *                                                                   *
 * This structure contains information about the list item id for    *
 * the first control on every page.  This data will be linked to     *
 * each page as it is added to the notebook.                         *
 *                                                                   *
 *********************************************************************/
typedef struct _PAGEDATA
{
    SHORT    sListItemId;
} PAGEDATA;
```

AT9-93-030

15

```
/*******************************************************************
*                                                                   *
* fnwpMyWindow - PM message handler for MyWindow                    *
*                                                                   *
* MyWindow is the dialog window containing the notebook and         *
*   listbox controls.                                               *
*                                                                   *
*******************************************************************/
MRESULT EXPENTRY fnwpMyWindow (HWND hwnd, ULONG msg, MPARAM mp1, MPARAM mp2)
{

HWND       hwndPage, hwndNotebook, hwndListBox, hwndFirstControl;
    USHORT     usNotify;
    SHORT      sListItem;
    ULONG      ulPageId;
    PSZ        pszListItem;
    PAGEDATA   *pPageData;
    LISTITEMDATA *pListItemData;

hwndNotebook = WinWindowFromID(hwnd, ID_NOTEBOOK);
    hwndListBox  = WinWindowFromID(hwnd, ID_LISTBOX);

switch (msg)
    {
       case WM_INITDLG:

/***************************************************************
* During intialization, populate the notebook and the listbox. *
***************************************************************/

//      for each page
       //      {

//         hwndPage = dialog window for this page

/***************************************************************
* Add the page                                                 *
***************************************************************/
            ulPageId = (ULONG) WinSendMsg(hwndNotebook,
                          BKM_INSERTPAGE,
                          (MPARAM) 0L,
                          MPFROM2SHORT(BKA_AUTOPAGESIZE, BKA_LAST));
/***************************************************************
* Associate the appropriate dialog window with the page -      *
* this code assumes that the dialog window has already         *
* been created.                                                *
***************************************************************/
```

AT9-93-030

16

```
                WinSendMsg(hwndNotebook,
                        BKM_SETPAGEWINDOWHWND,
                        MPFROMLONG(ulPageId),
                        MPFROMHWND(hwndPage));

5      /***********************************************************
         * Allocate page data                                       *
         ***********************************************************/
                pPageData = malloc(sizeof(PAGEDATA));
10
        /***********************************************************
         * Link the page data to the page                           *
         ***********************************************************/
15              WinSendMsg(hwndNotebook,
                        BKM_SETPAGEDATA,
                        MPFROMLONG(ulPageId),
                        MPFROMP(pPageData));

20      //              for each control on the page that is to be
        indexed in the list
        //              {
        //                      pszListItem = text string to put in the list 25      /***********************************************************
         * Add the list item to the list                            *
         ***********************************************************/
                sListItem = SHORT1FROMMR(WinSendMsg(hwndListBox,
                        LM_INSERTITEM,
30                      MPFROMSHORT(LIT_END),
                        MPFROMP(pszListItem)));

/***********************************************************
         * Allocate list item data                                  *
35       ***********************************************************/
                pListItemData = malloc(sizeof(LISTITEMDATA));

/***********************************************************
         * Initialize list item data                                *
40       ***********************************************************/
                pListItemData -> ulPageId = ulPageId;
                pListItemData -> ulControlId =
        //                      associated control's resource id 45      /***********************************************************
         * Link list item data to list item                         *
         ***********************************************************/
                WinSendMsg(hwndListBox,
                        LM_SETITEMHANDLE,
```

AT9-93-030

```
                                    MPFROMSHORT(sListItem),
                                    MPFROMP(pListItemData));

/**********************************************************
     * If this is the first control on the page               *
     *   set page data to this list item id                   *
     **********************************************************/
                hwndFirstControl = WinEnumDlgItem(hwndPage,
                                      (HWND) NULL,
                                      EDI_FIRSTTABITEM);
                if(hwndFirstControl == WinQueryWindowFromID(hwndPage,
    //                  this control id))
                    {
                        pPageData -> sListItemId = sListItem;
                    }
    //          } /* end for each control to be indexed */
            } /* end for each page */ break;

case WM_CONTROL:
    /**************************************************************
     * User has interacted with one of the window controls.       *
     **************************************************************/ usNotify = SHORT2FROMMP(mp1);

/**************************************************************
     * Switch on control id                                       *
     **************************************************************/
            switch(SHORT1FROMMP(mp1))
            {
                case ID_LISTBOX:
    /**********************************************************
     * If the user clicked or double clicked on an item in    *
     * the list box                                           *
     **********************************************************/
                    if (usNotify == LN_ENTER || usNotify == LN_SELECT)
                    {
    /**********************************************************
     * Get the id of the new selected list item.              *
     **********************************************************/
                        sListItem = SHORT1FROMMR(WinSendMsg(hwndListBox,
                                      LM_QUERYSELECTION,
                                      MPFROMSHORT(LIT_FIRST),
                                      (MPARAM)NULL));

/**********************************************************
```

AT9-93-030

18

```
           /************************************************
            * Get the list item information.               *
            ************************************************/
                    pListItemData = (LISTITEMDATA *) WinSendMsg (hwndListbox,
                                    LM_QUERYITEMHANDLE,
 5                                  MPFROMSHORT(sListItem),
                                    (MPARAM)NULL);

/************************************************
            * Query current top page.                      *
10          ************************************************/
                    ulPageId = (ULONG)WinSendMsg(hwndNotebook,
                                    BKM_QUERYPAGEID,
                                    MPFROMLONG(0L),
                                    MPFROM2SHORT(BKA_TOP,0));
15
           /************************************************
            * If current top page is not the page corresponding *
            * to the list item, turn to the new page.      *
            ************************************************/
20                  if (ulPageId != pListItemData -> ulPageId)
                        WinSendMsg(hwndNotebook,
                                    BKM_TURNTOPAGE,
                                    MPFROMLONG(pListItemData -> ulPageId),
                                    MPFROMLONG(0L));
25
           /************************************************
            * Get window handle of dialog on page.         *
            ************************************************/
                    hwndPage = (HWND)WinSendMsg( hwndNotebook,
30                                  BKM_QUERYPAGEWINDOWHWND,
                                    MPFROMLONG(ulPageId),
                                    MPFROMP(NULL));

/************************************************
35          * Put focus on appropriate control.            *
            ************************************************/
                    WinSetFocus(HWND_DESKTOP,
                        WinWindowFromID(hwndPage, pListItemData -> ulControlId));

40              }
                break;

case ID_NOTEBOOK:
           /************************************************
45          * If the user selected a new page in the notebook *
            ************************************************/
                if (usNotify == BKN_PAGESELECTED)
                {
           /************************************************
```

AT9-93-030

19

```
         * Query the new top page.                       *
         *********************************************/
                     ulPageId = (LONG)WinSendMsg( hwndNotebook,
                                     BKM_QUERYPAGEID,
 5                                   MPFROMLONG(0L),
                                     MPFROM2SHORT(BKA_TOP,0));

/*********************************************
          * Get window handle of dialog on page.        *
10       *********************************************/
                     hwndPage = (HWND)WinSendMsg( hwndNotebook,
                                     BKM_QUERYPAGEWINDOWHWND,
                                     MPFROMLONG(ulPageId),
                                     MPFROMP(NULL));
15
         /*********************************************
          * Make the dialog for the page the active window. *
          *********************************************/
                     WinSetActiveWindow( HWND_DESKTOP, hwndPage );
20
         /*********************************************
          * Set focus on first control on page.         *
          *********************************************/

25                   hwndFirstControl = WinEnumDlgItem(hwndPage,
                                     (HWND) NULL,
                                     EDI_FIRSTTABITEM);
                     WinSetFocus(HWND_DESKTOP, hwndFirstControl);

30       /*********************************************
          * Query the page data.                        *
          *********************************************/
                     pPageData = (PAGEDATA *) WinSendMsg( hwndNotebook,
                                     BKM_QUERYPAGEDATA,
35                                   MPFROMLONG(ulPageId),
                                     (MPARAM) NULL );

/*********************************************
          * Select list item for first control on page. *
40       *********************************************/
                     WinSendMsg(hwndListBox,
                             LM_SELECTITEM,
                             MPFROMSHORT(pPageData -> shistItemId),
                             MPFROMSHORT(TRUE));
45           }
             break;
         }
         break;
     }
```

AT9-93-030

20

Copyright (C) International Business Machines, Inc., 1993

Although certain preferred embodiments of the present invention have been shown and described, it should be understood that many changes and modifications may be made therein without departing from the scope of the appended claims.

Although certain preferred embodiments of the present invention have been shown and described, it should be understood that many changes and modifications may be made therein without departing from the scope of the appended claims.

We claim:

1. A method of displaying a notebook by a computer system, said notebook having a plurality of grouped alphabetically ordered tabs and at least a first portion with at least two parameters associated therewith, comprising:

selecting one of said grouped alphabetically ordered tabs;

displaying on said computer system associated said parameters of a first page of said selected one of said grouped alphabetically ordered tabs in said first portion of said notebook wherein the associated said parameters include view data and control data;

displaying simultaneously with said first portion of said notebook an alphabetically ordered list of items of said selected one of said grouped alphabetically ordered tabs in a second portion of said notebook, said alphabetically ordered list representing a set of pages of said notebook;

displaying simultaneously with said second portion of said notebook said plurality of grouped alphabetically ordered tabs in said first portion of said notebook; and selecting one of said items in a single user input operation in said second portion and directly displaying associated said parameters in said first portion of said notebook wherein the associated said parameters include view data and control data for said selected item.

2. The method according to claim 1 wherein said step of selecting one of said items further comprises the step of:

associating corresponding data in a second list for said selected one of said items by a relational facility.

3. The method according to claim 1 wherein said first page is a window on said computer system having fixed dimensions and fixed locations for said view data and control data parameters.

* * * * *